UNITED STATES PATENT OFFICE.

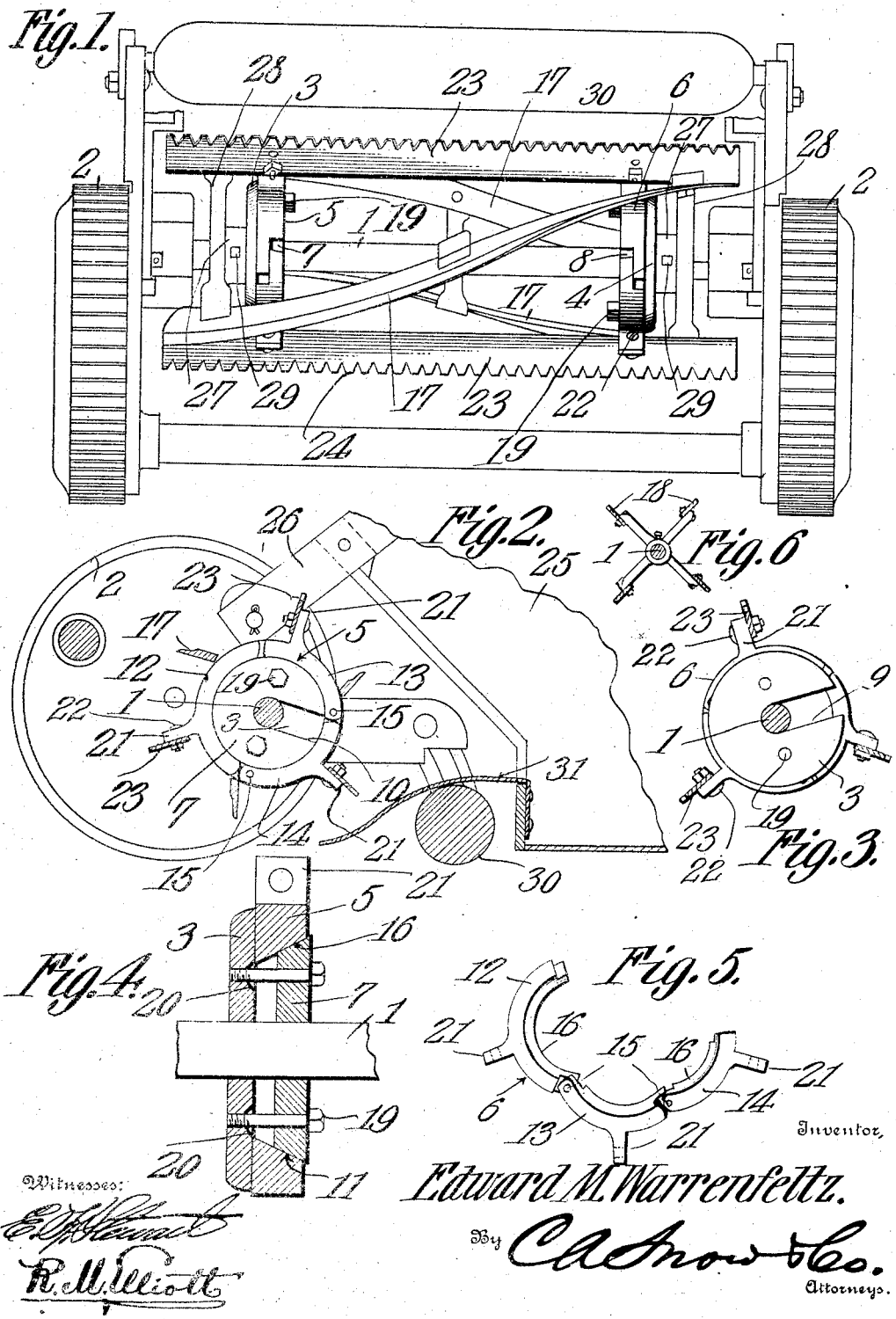

EDWARD M. WARRENFELTZ, OF FUNKSTOWN, MARYLAND.

ROTARY RAKE.

No. 902,187.  Specification of Letters Patent.  Patented Oct. 27, 1908.

Application filed July 1, 1908. Serial No. 441,349.

*To all whom it may concern:*

Be it known that I, EDWARD M. WARRENFELTZ, a citizen of the United States, residing at Funkstown, in the county of Washington and State of Maryland, have invented a new and useful Rotary Rake, of which the following is a specification.

This invention relates generally to lawn mowers, and particularly to a novel attachment for raking up the leaves in the fall of the year, and depositing them in a suitable receptacle carried by the handle of the machine.

The object of the invention is to provide an attachment of this character which may be readily assembled with a lawn mower already in use, without requiring any change whatever in its structural arrangement, whereby the labor incident to gathering up the leaves with an ordinary rake is obviated, and other objectionable features are eliminated.

With the above and other objects in view, as will appear as the nature of the invention is better understood, the same consists in the novel construction and combination of parts of a leaf raking attachment for lawn mowers as will be hereinafter fully described and claimed.

In the accompanying drawings forming a part of this specification, and in which like characters of reference indicate corresponding parts, Figure 1 is a top plan view of an ordinary lawn mower, equipped with the improvements of the present invention. Fig. 2 is a transverse sectional view through the machine, showing the attachment and also the receptacle for receiving leaves. Fig. 3 is a transverse sectional view through the reel of the lawn mower, viewed from the opposite side of that shown in Fig. 2. Fig. 4 is a longitudinal sectional view on an enlarged scale, of the clamping device for attaching the rake members to the lawn mower. Fig. 5 is a detail view of one of the parts of the attachment. Fig. 6 is a transverse sectional view of a modified form of the invention.

Referring to the drawings, 1 designates the main or driven shaft of the mower which is actuated by mechanism not necessary to be shown, from ground wheels 2 as usual. The other parts of the mower have nothing whatever to do with the present invention, and therefore are not specifically described. It may be stated, at this point, that when the attachment is applied to a machine, it will be necessary to remove the stationary knife or shearing bar that coöperates with the mower knives, and in Figs. 1 and 2 this shearing bar is omitted.

The attachment comprises two disks 3 and 4, two articulated rake carrying members 5 and 6, and two expanders 7 and 8 for the rake carrying members. Each of the disks, 3 and 4 is a counterpart of the other and each is provided with a slot 9, to straddle the shaft 1, as clearly shown in Fig. 3. Each of the expanders 7 and 8 is a counterpart of the other and each comprises a disk having a slot 10 to straddle the shaft 1, and a beveled periphery 11, as clearly shown in Fig. 4, the expander constituting in effect a truncated cone.

Each of the rake carrying members 5 and 6 is a counterpart of the other and each comprises in this instance, three segmental members 12, 13 and 14 the ends of which are rabbeted and over-lapped, and two of the segments are pivotally connected with the third segment by rivets 15, and this will permit of the segments being readily adjusted around the expander in the manner shown in Fig. 4. The inner wall 16 of each of the segments is oppositely beveled to the periphery of the expander and is engaged thereby.

As the lawn mower shown is provided with but three knives 17, there will be but three rakes, but where the mower is provided with four knives, as shown in Fig. 6, there will be four rakes, and these are designated by 18 in the latter figure.

The means for assembling an expander with a disk consists of two bolts 19 that pass loosely through the expander and are threaded into the disk and in order to facilitate the positioning of the bolts, the entering ends of the orifices in the disks that receive them are countersunk as shown at 20 in Fig. 4.

Each of the segments of the rake carrying members is provided with a radially extending arm 21, and to the six arms thus provided are secured by bolts 22, the rakes 23, each of which, as clearly shown in Figs. 1 and 2, consists of a strip of metal having blunt teeth 24, preferably approximately triangular in form, although they may be of other contours. The rakes are straight and when driven from the shaft 1, will pick up the leaves and throw them into a suitable receptacle 25 supported in any suitable manner from the handle yoke 26.

In assembling the attachment with a lawn mower already in use, the disks 3 and 4 are first placed upon the driving shaft and bear against the collars 27 that are carried by the spiders 28 to which knives 17 are secured, the collars being held against longitudinal movement relative to the shaft by bolts 29. After the disks have been so positioned the rake carrying members 5 and 6, with the rakes detached, are inserted between the knives and around the shaft, and the expanders are then placed upon the shaft. Upon the bolts 19 being positioned and tightened, the expanders will be moved toward the disks and the contact between their peripheries and the inner walls of the segments will force the latter outward and into engagement with the inner edges of the knives, thereby firmly clamping the rake carrying members in position. The rakes are now placed against the arms 21, and the bolts 22 secured in place, thus completing the assemblage of the attachment with the mower. It will be noted that each of the rakes is provided with two pairs of orifices to receive the bolts 22, the object of this arrangement being to permit the reversal of the rakes so as to present either their toothed edges or their smooth edges to the leaves, it having been found in practice that under certain conditions the latter will be as effective in gathering up the leaves as the former.

Inasmuch as the rakes project beyond the cutting edges of the knives, it will be necessary to remove the ordinary shear bar, (not shown), to allow the rakes properly to perform their function.

In order to prevent the leaves from falling under the ground roller 30, there is a sheet metal shield 31 employed which, as clearly shown in Fig. 2, is secured to the receptacle 25 and projects over the roller 30 and under the rakes a sufficient distance to secure the object sought.

I claim:

1. An attachment for lawn mowers, comprising a pair of rake carrying members each consisting of a plurality of articulated segments, rakes connected with the segments, and means for expanding the members.

2. An attachment for lawn mowers comprising a pair of rake carrying members each consisting of a plurality of articulated segments, rakes connected with the segments, means for expanding the members, and devices for holding the expanding means in their adjusted position.

3. An attachment for lawn mowers comprising a pair of articulated members each provided with a like number of arms, rakes carried by the arms, a pair of expanders coacting with the members, a pair of disks, and means for connecting the expanders and disks.

4. An attachment for lawn mowers comprising a pair of articulated members each provided with a like number of arms, rakes detachably connected with the arms, a pair of expanders housed by the members, a pair of disks against which the members bear, and means for connecting the expanders and disks.

5. An attachment for lawn mowers, comprising a pair of interiorly beveled articulated members each provided with a like number of arms, rakes carried by the arms, a pair of peripherally beveled expanders for the members, a pair of disks, and means for connecting the expanders and disks.

6. An attachment for lawn mowers comprising a pair of interiorly beveled articulated members each provided with a like number of arms, rakes carried by the arms, a pair of radially slotted peripherally beveled expanders for the members, a pair of radially slotted disks, and means for connecting the expanders and disks.

7. The combination with the driving shaft of a lawn mower, of a pair of radially slotted disks arranged thereon, a pair of radially slotted peripherally beveled expanders, also mounted on the shaft, a pair of interiorly beveled articulated members housing the expanders and provided each with a like number of arms, rakes secured to the arms, and bolts passing through the expanders and engaging threaded orifices in the disks to force the expanders against the articulated members to cause the latter to be forced into the engagement with the inner edges of the cutting knives.

8. An attachment for lawn mowers comprising a pair of expansible rake carrying members, rakes connected with the members, and means for expanding the members.

In testimony that I claim the foregoing as my own, I have hereto affixed my signature in the presence of two witnesses.

EDWARD M. WARRENFELTZ.

Witnesses:
SYLVESTER L. V. YOUNG,
H. S. POFFENBERGER.